United States Patent

[11] 3,628,401

| [72] | Inventor | Robert P. Wuerfel<br>4010 Galt Ocean Drive, Fort Lauderdale, Fla. 33308 |
|---|---|---|
| [21] | Appl. No. | 105,273 |
| [22] | Filed | Jan. 11, 1971 |
| [45] | Patented | Dec. 21, 1971<br>Continuation-in-part of application Ser. No. 29,904, Apr. 20, 1970, now abandoned. This application Jan. 11, 1971, Ser. No. 105,273 |

[54] GEARINGS
7 Claims, 10 Drawing Figs.

[52] U.S. Cl. ..................................... 74/865, 74/789
[51] Int. Cl. ................................... B60k 21/00, F16h 57/10
[50] Field of Search .......................... 74/865, 789

[56] References Cited
UNITED STATES PATENTS

| 1,685,523 | 9/1928 | Dodge ........................ | 74/789 |
|---|---|---|---|
| 1,735,898 | 11/1929 | Furber ........................ | 74/789 |
| 3,076,353 | 2/1963 | Gsching ...................... | 74/865 X |
| 3,368,426 | 2/1968 | Karig et al. ................. | 74/865 |

FOREIGN PATENTS

| 412,306 | 6/1934 | England .................... | 74/865 |

Primary Examiner—Arthur T. McKeon
Attorney—Settle and Oltman

ABSTRACT: A gearing of the sun gear, outer gear, and planetary gearing type wherein means are provided to retard or inhibit walking movement of the planetary gearing around the sun gear to change the drive ratio, and wherein such means comprises a mechanical, operator-controlled means for applying a holding force to the planetary gearing to a greater or lesser extent.

The gearing may be used wherever it is desired to change the drive ratio in a gearing; and may also be used as parts of other apparatus, such as double wheel drives wherein one wheel moves faster than the other despite being driven from a common drive.

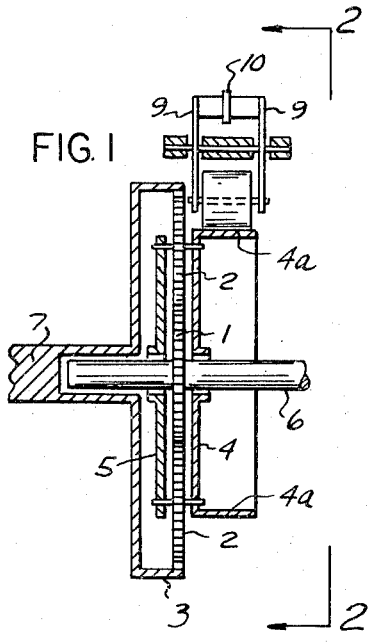
FIG. 1
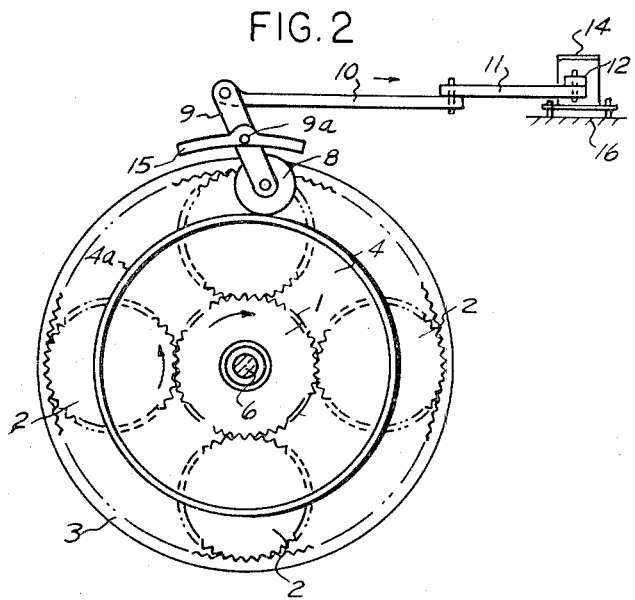
FIG. 2
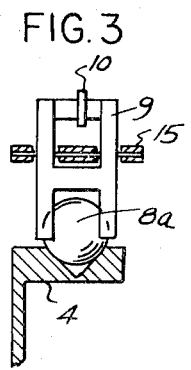
FIG. 3
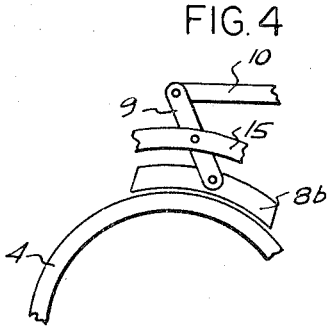
FIG. 4
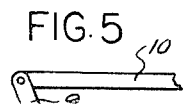
FIG. 5
FIG. 6

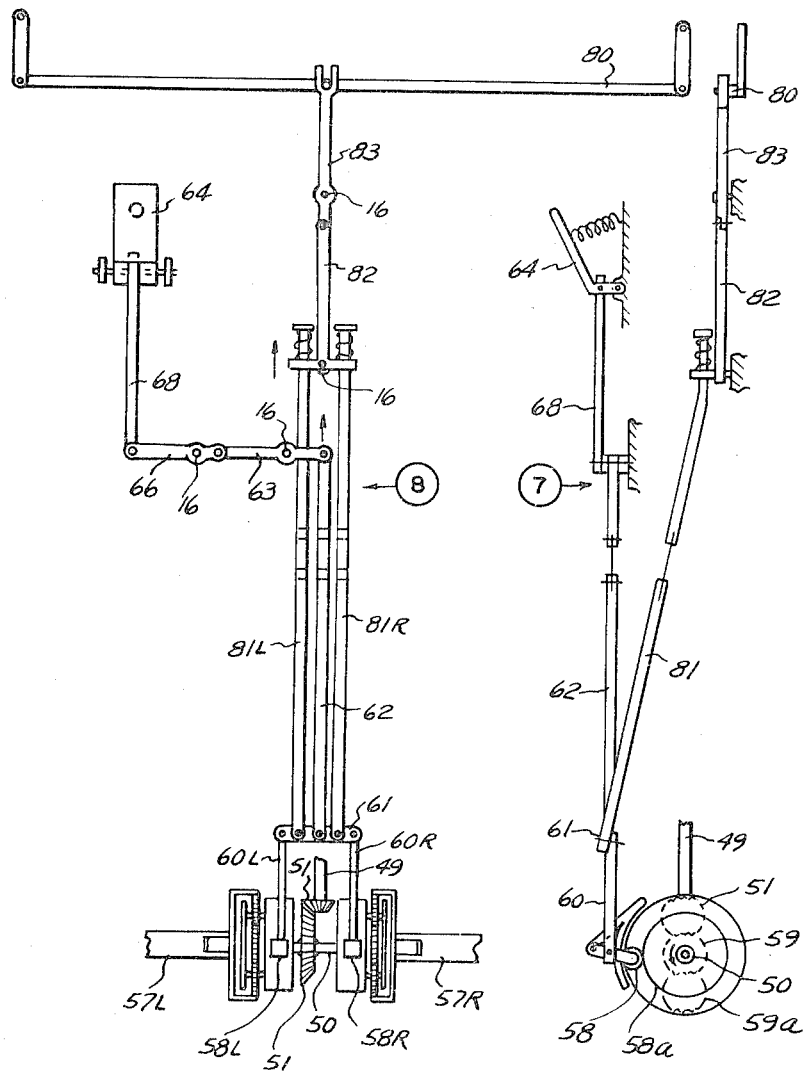

INVENTOR.
ROBERT P. WUERFEL
BY
SETTLE & OLTMAN
ATTORNEYS

GEARINGS

RELATED APPLICATION

This application is a continuation-in-part of copending application Ser. No. 29,904 now abandoned filed on Apr. 20, 1970.

BACKGROUND OF THE INVENTION

With constant-speed motor-driven apparatus, the only known means for changing the speed of the vehicle, for example which is driven by the constant-speed motor, is to vary the gear ratio between the motor and the driving wheels. This application discloses a practical method of varying the gear ratio, with the control being established through a foot pedal, for example the common accelerator pedal of a vehicle.

In such an instance, although the driver manually operates the control, in essence, because he would be operating the same control even if he were using a conventional gearshifting transmission, automatic or otherwise, the change in gear ratio takes place automatically and without further action on the part of the operator whose only operation is accelerator pedal manipulation such as he would operate in any event.

The invention is particularly useful in vehicles as a means of replacing the conventional differential.

In such a vehicle each of the two drive axles is connected by the gearing thereof to a common drive shaft. The holding members for the two sets of gearings are connected to a single control which is part of the steering apparatus. As the vehicle is steered around the turn, such control automatically increases the gear ratio of one drive axle gearing and simultaneously decreases the gear ratio of the other drive axle gearings and in this way commits the outer wheel to move faster than the inner wheel exactly as would be the case if there were a differential.

THE DRAWINGS

Embodiments of the invention are diagrammatically indicated in the appended drawings. In these drawings:

FIG. 1 is a diagrammatic view in elevational section of a gearing having a holding means for the planetary gear;

FIG. 2 is a view as if in the direction of arrow 2 of FIG. 1 and discloses in some detail a foot pedal control for the holding means;

FIGS. 3, 4 and 5 show various forms of holding means;

FIG. 6 illustrates a mechanical connection between a gas accelerator pedal and a foot pedal control;

FIG. 7 is a top plan view of vehicle parts showing two drive axles, as for example on rear wheels, and two steering spindles, as for example on front wheels, with a control arrangement between the parts, and with a gearing employed on each of the drive axles;

FIG. 8 is a diagrammatic view as if on arrow 8 of FIG. 7; and

DETAILED DESCRIPTION

The Gear Set

Figure 9:
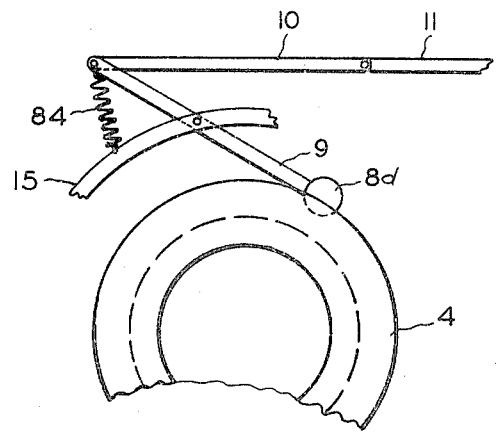
FIGS. 9 and 10 show another form of holding means.

The basic element of this disclosure is a gear set. As shown in FIGS. 1 and 2, it includes a drive shaft 6 to which is fixed a sun gear 1 for driving an outer gear 3 fixed to a driven shaft 7, via one or more planetary gears 2 carried by carriers 4 and 5, journaled on drive shaft 6.

Holding

Carrier 4 has a cylindrical flange 4a adapted to be engaged or held by a holding member, roller 8, on the end of a lever arm 9 pivoted on a fixed housing 15.

Control

To vary the position of holding roller 8 and thus to vary the holding force of roller 8 on carrier 4 and its flange 4a, an operator control is provided. This includes links 10, 11 and 12 which connect lever 9 to a control member, such as foot pedal 14, pivotally mounted on a fixed structure, such as frame 16.

Operation

In idle position, with no holding force applied to roller 8, no power is transmitted from shaft 6 to shaft 7 via gear 1–3–2, since the planetary gears 2 will "walk around" within the outer gear 3 and deliver no power.

As the holding force of roller 8 is varied, the tendency of gears 2 to "walk around" is varied, and the relative speeds of rotation of gears 3 and 1 will vary, and the gear ratio will vary.

Thus, the gear ratios and the relative speed of gears 3 and 1 will vary according to the operator's wishes, reflected by his manipulation of foot pedal control member 14.

Variations

While FIGS. 1 and 2 show four planetary gears 2, this number may be varied, as is well known.

Figure 10:
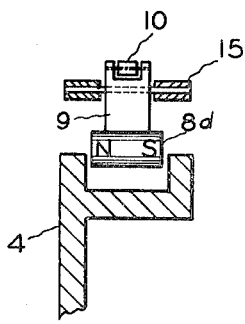

While holding member 8 is shown in FIGS. 1 and 2 as a simple roller, it might well be formed as part of a ball and groove arrangement 8a, as shown in FIG. 3; or a brake shoe type of arrangement 8b, as shown in FIG. 4; or a shoe and ball type of arrangement 8c, as shown in FIG. 5; or a permanent magnet type of arrangement 8d as shown in FIGS. 9 and 10; all of these being merely chosen mechanical variants of one another. Reference numeral 84 in FIGS. 9 and 10 is a spring opposing the holding force of magnet 8d which is magnetically coupled to the carrier 4.

Vehicles

The gear set of FIGS. 1 and 2 is particularly adapted for being combined usefully with other parts of vehicles, such as engines, steering means, rear axles, etc.

Throttling

FIG. 6 diagrammatically shows a vehicle arrangement including an engine (not shown) fed by a fuel line (not shown) through a valve (not shown) controlled by a throttle linkage 19 and a throttle foot pedal 18, as is well known. Such pedal 18 may be operatively connected to the control pedal 14 which controls holding member 8, via a cam 17.

Cam 17 is so contoured that one part of the movement of throttle pedal 18 varies the engine speed and the speed of the drive shaft 6, which may be the engine crankshaft, and simultaneously varies the holding force of member 8, and thus varies the gear ratio and the speed of driven shaft 7, which may be the vehicle drive shaft for the vehicle wheels. Another part of the movement of throttle pedal 18 varies the engine speed, and the speed of shaft 6, but without at that time varying the holding force of member 8, or the gear ratio, or the speed of shaft 7.

Steering

FIGS. 7 and 8 diagrammatically show parts of a vehicle. Longitudinal drive shaft 49, connected to the vehicle engine, drives a cross or axle shaft 50, via a pinion and gear set 51. Cross shaft 50 is connected via two gear sets according to FIGS. 1 and 2 to two aligned but separate drive wheel axles 57L and 57R. In these gear sets, the outer gears 59a are connected to the axles 57L and 57R. Also in these gear sets are two holding members 58, for holding the carriers 58a for the planetary gears. These are connected to a single control pedal, which may be a throttle pedal 64, by linkage 60L, 60R, 61, 62, 63, 66 and 68, all in accordance with FIGS. 1 and 2. Pivot points are located at 16.

Holding member 58 is also connected to a part 80 of the steering apparatus by linkage 60, 61, 81L, 81R, 82 and 83, whereby steering movement of part 80 will simultaneously and equally but oppositely vary the holding forces of members 58L and 58R, and the speeds of wheel axles 57L and 57R, enabling the left and right wheels to rotate at different speeds, with power transmitted to each wheel during vehicle turning.

The arrangement shown can replace differentials commonly used.

Having thus described my invention, I claim:

1. In a vehicle having an engine with a fuel line for supplying fuel thereto, the combination of:

a. a gear set having a driving sun gear and a driven outer gear, and a planetary gear connecting the sun gear and the outer gear;

b. means to retard or inhibit walking movement of the planetary gear around the sun gear whereby to vary the drive ratio of the sun gear and the outer gear;
c. said means comprising an operator-controlled holding member for applying a holding force to the planetary gear to a greater or lesser extent, with the result that a change in the holding force on the planetary gear changes the tendency of the planetary gear to walk around the sun gear and change the drive ratio;
d. said means for applying the holding force on the planetary gear also including a throttling foot pedal connected to the fuel line for enabling the operator to personally control the fuel feed to the engine and thus control engine speed, with a linkage connecting the foot pedal to the holding member which controls the planetary gear whereby the operator can change the drive ratio at the same time he changes engine speed by manipulation of the foot pedal.

2. The combination according to claim 1 wherein the linkage which connects the foot pedal to the holding member includes a cam so contoured that the foot pedal can be manipulated to increase fuel feed and vary the gear ratio and can also be manipulated to increase fuel feed but without varying the gear ratio.

3. The combination according to claim 1 wherein the holding member for applying a holding force to the planetary gear includes a roller riding on a rotary carrier for the planetary gear.

4. The combination according to claim 1 wherein the holding member for applying a holding force to the planetary gear comprises a ball riding in a groove on a rotary carrier for the planetary gear.

5. The combination as claimed in claim 1 wherein the holding member for applying a holding force to the planetary gear includes a brakeshoe engageable with a rotary carrier for the planetary gear.

6. The combination as claimed in claim 5 wherein the brakeshoe includes ball members engageable with the carrier.

7. The combination as claimed in claim 1 wherein the holding member for applying a holding force to the planetary gear includes a permanent magnet magnetically coupled to a rotary carrier member for the planetary gear.

* * * * *